United States Patent
Brause et al.

(10) Patent No.: US 8,488,270 B2
(45) Date of Patent: Jul. 16, 2013

(54) DISK DRIVE HAVING A SHEET METAL CLAMP WITH A STAMPED ANNULAR PROTRUDING DISK CONTACT FEATURE

(75) Inventors: David D. Brause, Longmont, CO (US); Curtis S. German, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 137 days.

(21) Appl. No.: 13/118,235

(22) Filed: May 27, 2011

(65) Prior Publication Data
US 2012/0300344 A1 Nov. 29, 2012

(51) Int. Cl.
*G11B 17/022* (2006.01)

(52) U.S. Cl.
USPC ..................................... 360/99.12; 360/98.08

(58) Field of Classification Search
USPC ............................................ 360/99.12, 98.08
See application file for complete search history.

(56) References Cited

U.S. PATENT DOCUMENTS

| | | | |
|---|---|---|---|
| 4,945,432 A * | 7/1990 | Matsudaira et al. ....... | 360/98.02 |
| 5,422,768 A * | 6/1995 | Roehling et al. ........... | 360/98.08 |
| 5,426,548 A | 6/1995 | Fujii et al. | |
| 5,459,627 A | 10/1995 | Peter | |
| 5,517,376 A | 5/1996 | Green | |
| 5,724,209 A | 3/1998 | Dunckley et al. | |
| 5,940,244 A | 8/1999 | Canlas et al. | |
| 5,982,581 A * | 11/1999 | Kazmierczak et al. ..... | 360/98.08 |
| 6,208,486 B1 | 3/2001 | Gustafson et al. | |
| 6,417,988 B1 | 7/2002 | Renken et al. | |
| 6,483,661 B1 | 11/2002 | Martin et al. | |
| 6,724,568 B1 | 4/2004 | Suwito et al. | |
| 6,888,699 B2 * | 5/2005 | Drake et al. ............... | 360/99.12 |
| 6,961,216 B2 | 11/2005 | Chan et al. | |
| 7,057,852 B1 | 6/2006 | Butler et al. | |
| 7,126,787 B2 | 10/2006 | Chan et al. | |
| 7,209,320 B1 * | 4/2007 | Woods et al. .............. | 360/99.12 |
| 7,215,509 B2 | 5/2007 | Ng | |
| 7,239,476 B2 | 7/2007 | Chan et al. | |
| 7,511,919 B2 * | 3/2009 | Suzuki et al. .............. | 360/99.12 |
| 7,545,601 B2 | 6/2009 | Hanada et al. | |
| 2007/0230039 A1 | 10/2007 | Koizumi et al. | |
| 2007/0242388 A1 | 10/2007 | Goksel et al. | |

\* cited by examiner

*Primary Examiner* — Angel Castro

(57) ABSTRACT

A disk drive includes a spindle motor attached to a disk drive base. The spindle motor includes a hub that rotates about a spindle rotation axis. An annular disk is mounted on the hub. A clamp is attached to the hub. The clamp has a body portion that is stamped from a metal sheet. The clamp also includes an annular rib that protrudes from the stamped sheet metal body portion towards the annular disk. The annular rib includes an annular contact surface that may be lapped to enhance flatness and that contacts the annular disk. The annular rib also includes inner and outer side walls that are each normal to the annular contact surface.

10 Claims, 3 Drawing Sheets

DISK DRIVE HAVING A SHEET METAL CLAMP WITH A STAMPED ANNULAR PROTRUDING DISK CONTACT FEATURE

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), which is clamped to a rotating hub of a spindle motor. A head stack assembly (HSA) is actuated to position heads adjacent the major surfaces of the disk(s), to read and write information stored thereon. The printed circuit board assembly includes electronics and firmware for controlling the rotation of the spindle motor, for controlling the actuation and position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to an adjacent disk surface. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on an adjacent disk surface.

The spindle motor typically includes the rotating hub (on which annular disks are mounted and clamped), a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. A disk clamp is typically attached to the rotating hub by threaded fasteners. The disk clamp typically includes a circular or annular contact surface that contacts and applies a clamping force to the top disk, so that it will rotate with the hub.

Many contemporary disk clamps are stamped from sheet metal to reduce their fabrication cost relative to disk clamps that are machined from a thicker metal stock. However, although stamped sheet metal clamps are desirably less expensive, the circular or annular contact surface may not be as flat. Poor flatness can cause unacceptably larger variation in clamping pressure around and near the disk inner diameter, which may in turn produce an undesirably larger warping of the clamped disk(s). Some of the resulting undesired curvature of the disk surface is known as "disk crown".

Disk crown due to non-uniform clamping can undesirably modulate and affect the microscopic spacing between the disk surface and the adjacent read/write head. Such microscopic spacing affects the performance of the head in reading and writing, and so excessive disk crown can adversely affect the performance and signal to noise ratio (SNR) associated with disk drive operations.

Hence, manufacturers of contemporary disk clamps have striven to enhance the flatness of the circular or annular contact surface of the disk clamp, to help the disk clamp exert a more uniform clamping pressure on the top disk. One way manufacturers have done this is to subject the circular or annular contact surface of the disk clamp to lapping. Lapping is a form of grinding and/or polishing that can enhance the flatness of a surface by abrasive removal of material.

However, with contemporary stamped sheet metal disk clamp designs, lapping the circular or annular surface of the disk clamp causes such surface to significantly grow in area. That is, with contemporary stamped sheet metal clamp designs, lapping can cause the maximum effective clamping radius to increase and/or the minimum effective clamping radius to decrease. The amount of such increase or decrease may vary, depending on the rate of material removal during lapping, the duration of lapping, the clamp design, and local variations in the clamp geometry. Therefore, with contemporary stamped sheet metal clamp designs, lapping the circular or annular surface of the disk clamp may increase part-to-part variability in the effective clamping radius. Part-to-part variability in effective clamping radius is undesirable in a disk drive because it may cause undesirable part-to-part variation in disk dynamic behavior and/or read head to disk spacing.

Therefore, there is a need in the art for a disk drive having a stamped sheet metal disk clamp design that can reduce part-to-part variation that may result from lapping.

DESCRIPTION OF PREFERRED EMBODIMENTS

Figure 1:
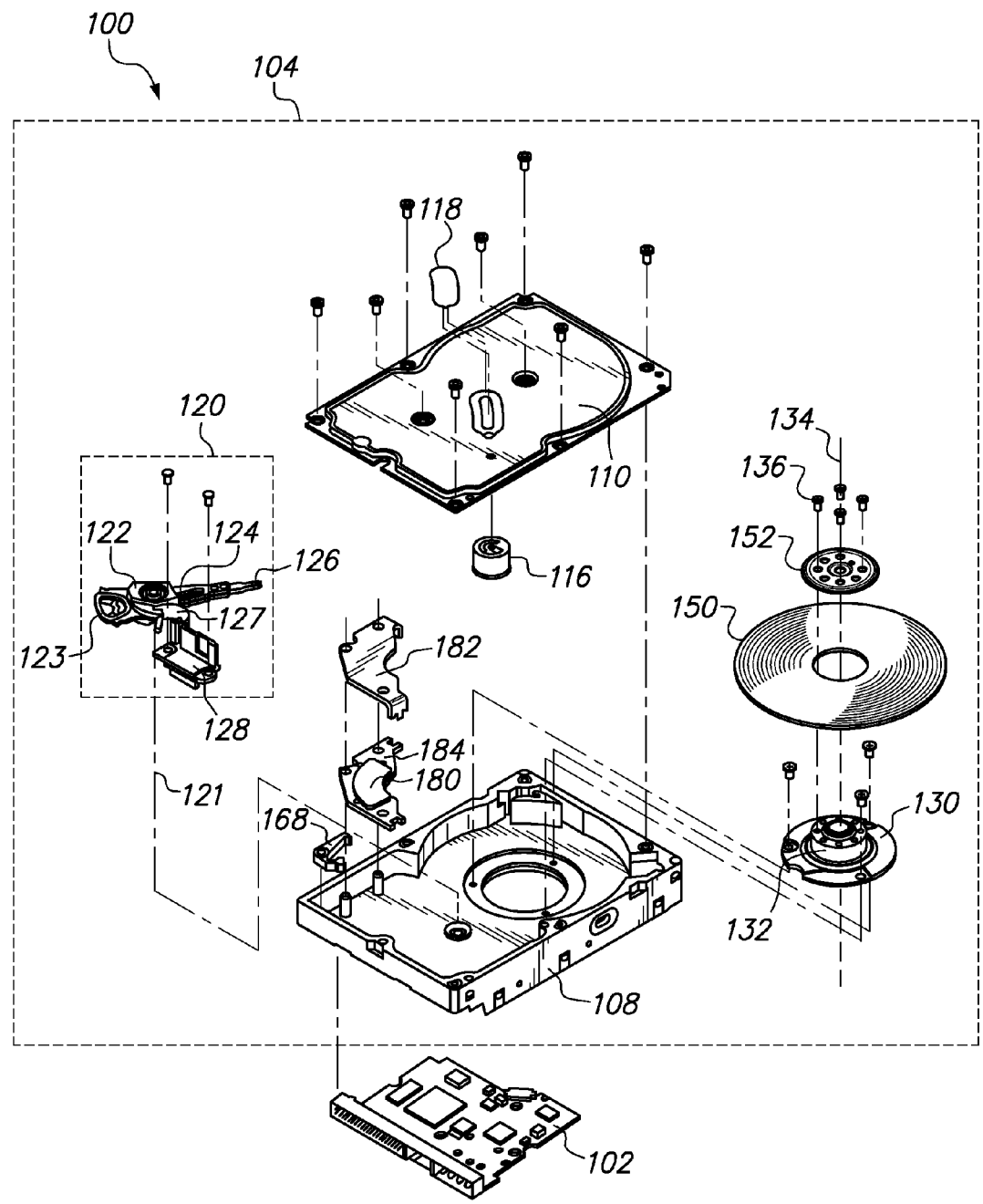
FIG. 1 is an exploded perspective view of a disk drive according to an embodiment of the present invention.

FIG. 1 is an exploded perspective view of a disk drive 100 according to an embodiment of the present invention. The disk drive 100 includes a head disk assembly (HDA) 104 and a printed circuit board assembly (PCBA) 102. The PCBA 102 includes conventional circuitry for processing signals and controlling the operations of the disk drive 100. The HDA 104 includes a base 108 and a cover 110 attached to the base 108 to collectively house at least one annular disk 150, a head stack assembly (HSA) 120 rotatably attached to the base 108, and a spindle motor 130 attached to the base 108. The spindle motor 130 rotates a hub 132 about a spindle rotation axis 134. The hub 132 may be cylindrical and rotated at a constant angular velocity. The annular disk 150 is mounted on, is clamped to, and rotates with, the hub 132, being clamped to the hub 132 by a disk clamp 152. In certain embodiments, the disk drive 100 of FIG. 1 may include a plurality of annular disks 150 that are mounted on the hub 132 of the spindle 130 and separated by spacer rings. For example, annular disk 150 may be a top disk under which one or more additional disks may be mounted on the hub 132 of the spindle 130. The disk(s) 150 may comprise an aluminum, glass, or ceramic substrate, for example with the substrate being coated with a NiP under-layer, a thin-film magnetic layer, a diamond-like amorphous carbon protective layer, and a very thin lubricant layer.

In the embodiment of FIG. 1, the HSA 120 may comprise a swing-type or rotary actuator 122. At least one actuator arm 124 may be cantilevered from the actuator 122. The rotary actuator 122 may be fabricated of a metal material such as aluminum, stainless steel, magnesium, beryllium, or an alloy thereof, by casting and/or forging. The HSA 120 also includes at least one head gimbal assembly (HGA) 126, a flex cable 127, and a flex cable bracket 128 fixed to the base 108. The HGA 126 supports a read head (too small to be visible in FIG. 1) adjacent to the annular disk 150, for writing and reading data to and from the annular disk 150.

In magnetic recording hard disk drive applications, the head may include a magneto resistive sensor for reading data from disk 150, and a longitudinal or perpendicular type inductive transducer for writing data to disk 150. In optical or magneto-optical recording applications, the head may include an objective lens for focusing laser light upon the recording media surface. The storage capacity of the disk drive 100 may be increased by the use of additional annular disks 150 and by the HSA 120 having correspondingly more HGAs 126 supported by multiple actuator arms 124.

In the embodiment of FIG. 1, a voice coil motor (VCM) may include top and bottom VCM plates 182, 184 mounted to the base 108. One or both of the VCM plates may include a permanent magnet (e.g. permanent magnet 180). The VCM plates 182, 184 form a yoke to carry magnetic flux from the permanent magnet(s). A coil 123 of the actuator 122 may be disposed between the top and bottom VCM plates 182 and 184 to cause rotation of the HSA 120 about a pivot axis 121, in response to an electrical current passed through the coil 123.

In this way, the VCM controllably positions the head(s) of the HSA 120 relative to the annular disk 150 for writing and/or reading data. The angular range of HSA pivoting may be limited by one or more stops, and the HSA may be held adjacent a stop by a latch (e.g. actuator latch 168). In certain embodiments, the cover 110 may include an opening for a breather filter 116 and a covering 118 for a larger opening for use in servo writing the annular disk 150. The base 108 may be attached to the cover 110 by means of screws or another conventional fastening method.

Figure 2:
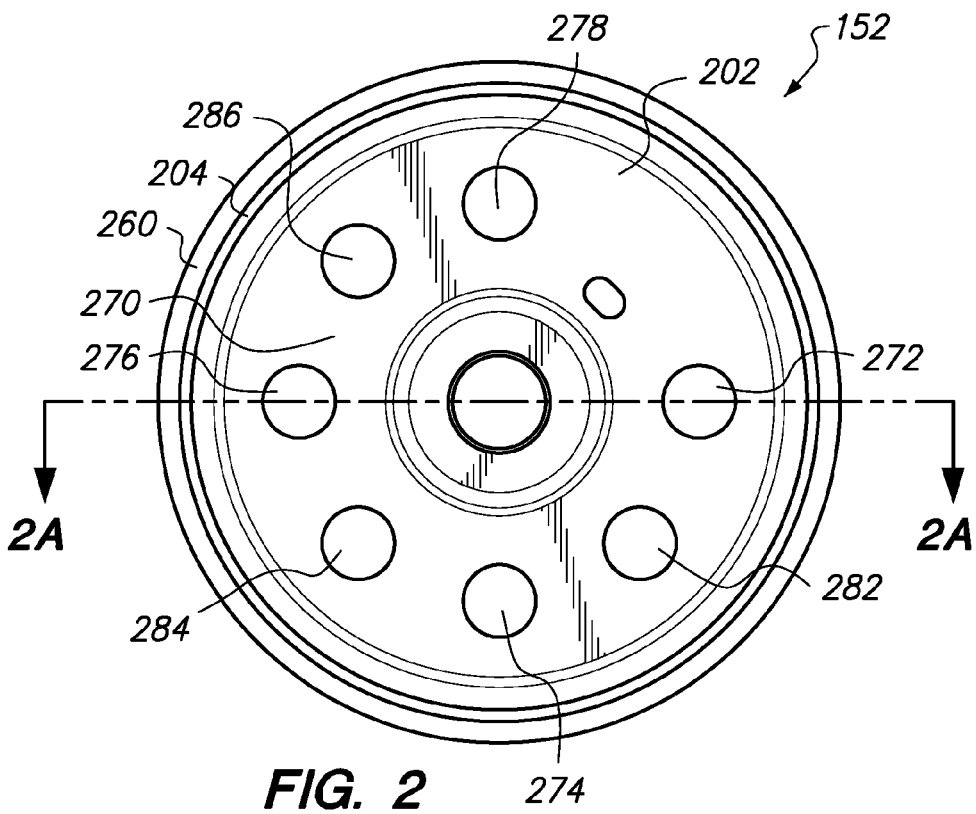
FIG. 2 is a bottom view of a disk clamp according to an embodiment of the present invention.
Figure 2A:
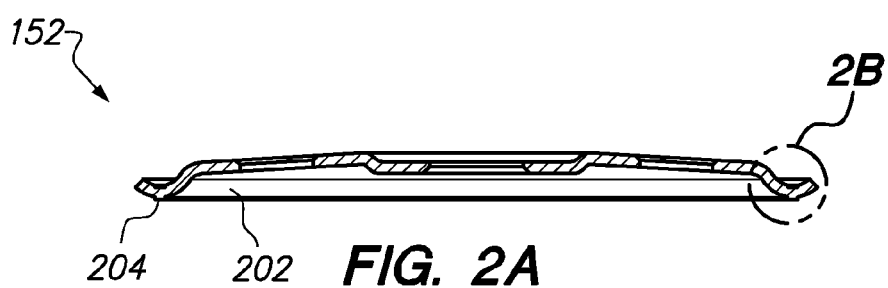
FIG. 2A is a radial cross-sectional view of the disk clamp of FIG. 2.
Figure 2B:
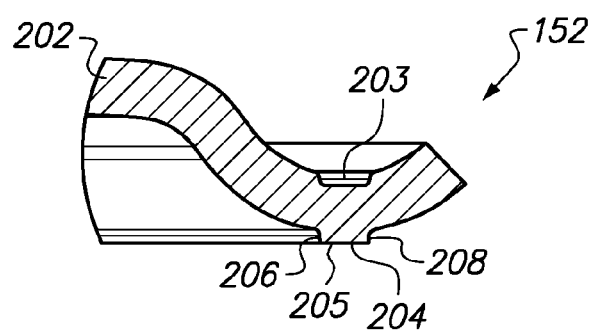
FIG. 2B is an expanded view of a portion of the radial cross-section of FIG. 2A.

FIG. 2 is a bottom view of a disk clamp 152 according to an embodiment of the present invention. FIG. 2A is a radial cross-sectional view of the disk clamp 152 of FIG. 2. FIG. 2B is an expanded view of a portion of the radial cross-section of FIG. 2A. In the embodiment of FIG. 2, the clamp 152 includes a stamped sheet metal body portion 202 that includes a clamp outer periphery 260 and a clamp inner region 270. One of ordinary skill in the mechanical arts can discern whether sheet metal has been stamped based on structural characteristics, such as curvatures, thickness variations, and surface appearance. Therefore, the word "stamped," as used herein, may be considered as a structural characteristic—not merely a description of method or process. The clamp 152 optionally includes a first plurality of holes 272, 274, 276, 278 therethrough, disposed in the clamp inner region 270.

The exploded view of FIG. 1 depicts how the clamp 152 of FIG. 2 may be assembled with other components of a disk drive (e.g. disk drive 100). Now referring to both FIG. 1 and FIG. 2, the clamp 152 contacts a top surface of the hub 132, and the clamp 152 is attached to the hub 132 by a plurality of fasteners 136. Each of the plurality of fasteners 136 passes through one of the first plurality of holes 272, 274, 276, 278. For example, each of the plurality of fasteners 136 may be a screw that extends into a corresponding threaded hole in the hub 132. In certain alternative embodiments, for example some of those designed for small form-factor disk drives, a single fastener may provide a downward force to the center of the clamp, in lieu of a plurality of fasteners arranged in a circle in the clamp inner region.

The hub 132 is shown in FIG. 1 to also optionally include a plurality of balance weight receptacles (e.g. note that the top surface of the hub has eight peripheral holes, rather than merely the four holes that are aligned to receive the four fasteners 136). Still referring to FIGS. 1 and 2, the clamp 152 also optionally includes a second plurality of holes 282, 284, 286 therethrough, to facilitate spindle balancing. For example, each of the second plurality of holes 282, 284, 286 may preferably be aligned with a corresponding one of the plurality of balance weight receptacles in the hub 132. Such alignment may allow a balance weight to be inserted in a chosen balance weight receptacle via one of the second plurality of holes, after the clamp 152 has been fastened to the hub 132.

Now referring to FIGS. 2, 2A, and 2B, the clamp 152 includes an annular rib 204 that protrudes from the stamped sheet metal body portion 202 towards the annular disk (e.g. disk 150 shown in FIG. 1). Referring again to FIG. 2B, the annular rib 204 includes an annular contact surface 205 that contacts the annular disk, and inner and outer side walls 206, 208 that are each normal to the annular contact surface 205. Comparison of FIG. 2B with FIG. 1 shows that the annular contact surface 205 is oriented so that it has a contact surface normal that is parallel to the spindle rotation axis 134. Since perfect normality or parallelism is not practical to achieve when fabricating stamped metal structures, the terms "normal to" or "parallel to", as used herein, shall mean within ±8 degrees of perfect normality or parallelism, respectively. In certain embodiments, the annular contact surface 205 is lapped to within a flatness tolerance that does not exceed 10 microns. Such inequality may advantageously reduce or limit undesired disk surface curvature, which might otherwise cause excessive modulation in the spacing between the disk 150 and an adjacent read head (too small to be visible in FIG. 1), during operation of the disk drive 100.

Referring again to FIGS. 2, 2A, and 2B, the annular rib 204 may be fabricated in the clamp outer periphery 260 by stamping, forming, and/or coining, for example. One of ordinary skill in the mechanical arts can discern whether sheet metal has been coined based on structural characteristics, such as curvatures, thickness variations, and surface appearance. For example, structural consequences of coining, that may distinguish stamping or forming, may include the absence of a negative feature on opposite side of the sheet metal part. Therefore, the word "coined," as used herein, may be considered as a structural characteristic—not merely a description of method or process.

Referring to FIGS. 1, 2, 2A, and 2B, the inner side wall 206 may be shaped as a first right circular cylinder about the spindle rotation axis 134. The outer side wall 208 may also be shaped as a second right circular cylinder about the spindle rotation axis 134. Hence, the inner side wall 206 may define a right circular cylinder that is concentric with and disposed within a right circular cylindrical shape of the outer side wall 208. Preferably, the inner side wall 206 defines a rib height measured parallel to the spindle rotation axis 134 that is in the range 50 microns to 250 microns. In certain embodiments, this dimensional range may be critical because its minimum may ensure that the remaining height of the annular rib 204 is adequate after lapping, and the maximum may prevent interference between the rotating disk clamp 152 and the stationary disk drive top cover 110, by ensuring adequate clearance in the so-called Z direction (i.e. parallel to the spindle rotation axis 134).

In certain embodiments, the thickness of the clamp 152, measured at the stamped sheet metal body portion 202 and not at the annular rib 204 (which may or may not be coined to a different thickness), is preferably in the range 0.4 mm to 0.8 mm. In certain embodiments, the annular rib 204 is created by stamping so that metal is sheared or bent or moved without any change in thickness. In such embodiments, the thickness measured at the annular rib 204 is the same as that measured elsewhere on the stamped sheet metal body portion 202, and a negative image 203 of the annular rib 204 is effectively imprinted on the opposite face of the disk clamp 152. In certain embodiments, such an embodiment is shown in FIGS. 2, 2A, 2B. Such negative image 203 can be a tell-tale structural consequence of the stamping process.

In certain alternative embodiments, the annular rib 204 is created by coining (instead of, or in addition to, stamping), so that the thickness at the annular rib 204 may be different than the thickness elsewhere on the stamped sheet metal body portion 202. Such an alternative embodiment may appear the same as that shown in FIGS. 2, 2A, 2B, except with the negative imprint 203 being absent. In certain embodiments, the absence of a negative image 203 may be a tell-tale structural consequence of the coining process.

Figure 3:
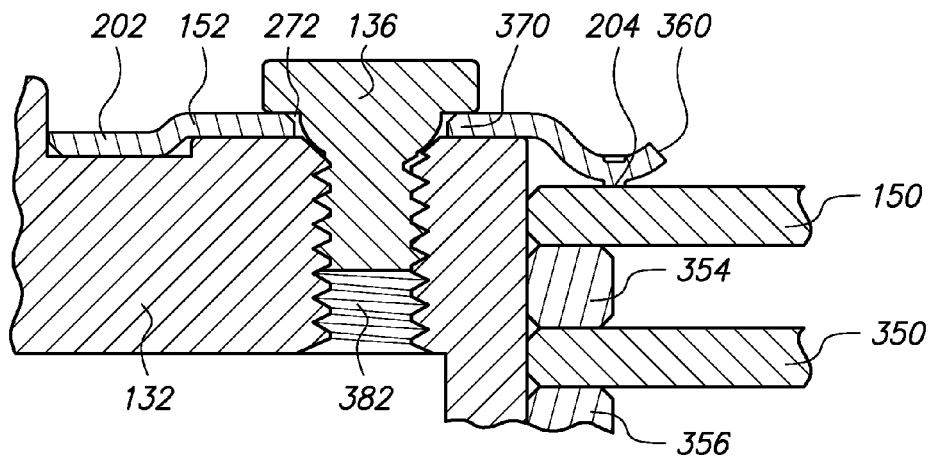
FIG. 3 is a radial cross-sectional view of a portion of a spindle motor hub, disk clamp, fastener, disks, and spacer rings, according to an embodiment of the present invention.

FIG. 3 is a radial cross-sectional view of a portion of a spindle motor hub 132, disk clamp 152, fastener 136, annular disks 150, 350, and spacer rings 354, 356, according to an embodiment of the present invention. The fastener 136 is a screw that passes through a hole 272 in the disk clamp 152, and extends into a threaded hole 382 of the hub 132. An inner region 370 of a stamped sheet metal body portion 202 of the disk clamp 152 receives a downward force from the fastener 136, which, in turn, provides a clamping pressure between the outer periphery 360 of the disk clamp 152 and the top disk 150. The downward force is applied to the top disk 150 via an annular rib 204 formed in the outer periphery 360 of the disk clamp 152. In the embodiment of FIG. 3, the stamped sheet metal body portion 202 and the annular rib 204 may together be single component having material continuity rather than being an assembly of sub-components.

Also disclosed herein is a novel method to fabricate a disk clamp for a disk drive (e.g. disk clamp 152 for disk drive 100). The novel method includes stamping a clamp body portion from a metal sheet, and forming an annular rib that protrudes from the stamped sheet metal body portion so that the annular rib includes an annular contact surface, and inner and outer side walls that are each normal to the annular contact surface (e.g. annular rib 204 of FIG. 2B). The forming of the annular rib may include stamping and/or coining, for example. Since perfect normality or parallelism is not practical to achieve when fabricating stamped metal structures, the terms "normal to" or "parallel to", as used herein, shall mean within ±8 degrees of perfect normality or parallelism, respectively.

In certain embodiments, the annular contact surface (e.g. annular contact surface 205 of FIG. 2B) is then lapped to reduce but not eliminate the protrusion of the annular rib from the stamped sheet metal body portion. For example, the inner side wall may define a rib height (before lapping) measured normal to the annular contact surface, in the range 50 microns to 250 microns. In certain embodiments, this dimensional range may be critical because its minimum may ensure that the remaining height of the annular rib 204 is adequate to not be completely removed by lapping, and the maximum may prevent interference (e.g. between the rotating disk clamp 152 and the stationary disk drive top cover 110 in FIG. 1) by ensuring adequate clearance in the so-called Z direction (i.e. parallel to the spindle rotation axis 134).

In certain embodiments, lapping may preferably be continued until the annular contact surface is within a flatness tolerance that does not exceed 10 microns. Such inequality may advantageously reduce or limit undesired disk surface curvature, which might otherwise cause excessive modulation in the spacing between the disk (e.g. disk 150 shown in FIG. 1) and an adjacent read head (too small to be visible in FIG. 1), during operation of the disk drive 100. In certain embodiments, the disk clamp (e.g. disk clamp 152) may be pressed against a lapping wheel with a force of 17 kilograms force to 65 kilograms force during lapping. Lapping with the clamp in a deflected state (e.g. corresponding to a pressure against the lapping wheel that is as similar as practical to clamping pressure experienced after disk drive assembly), is optional but preferred so that the annular contact surface may be more parallel to the annular disk surface after disk drive assembly (i.e. in the post-assembly deflected state).

Figure 4:
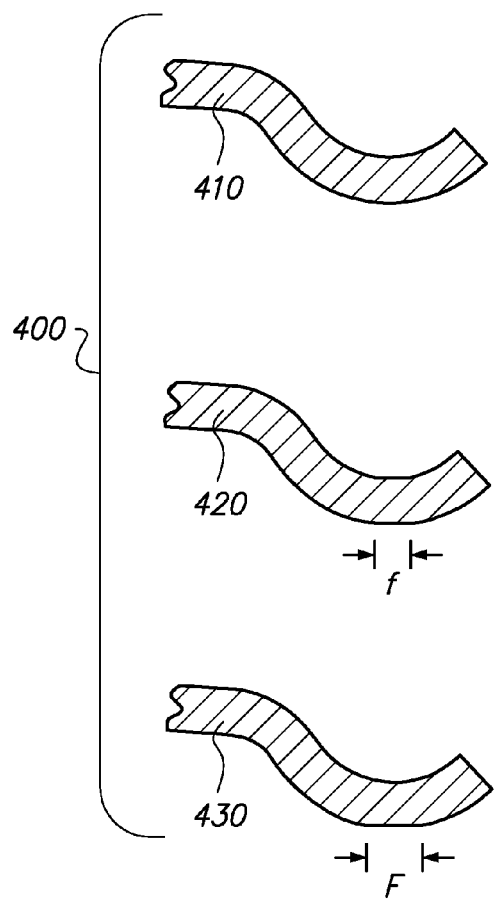
FIG. 4 is a radial cross-sectional view of a portion of a spindle motor hub after progressive stages of lapping, according to the prior art.

FIG. 4 is a radial cross-sectional view of a portion of a disk clamp 400 after progressive stages of lapping, according to the prior art. The cross-section 410 represents the disk clamp 400 before lapping. The cross-section 420 represents the disk clamp 400 at an intermediate stage of lapping. Note that at this stage, the lapping has created an annular flat region of radial extent f. The cross-section 430 represents the disk clamp 400 after the completion of lapping. Note that at this stage, the lapping has created an annular flat region of radial extent F, where F is substantially greater than f.

Such change in the radial extent of the annular flat region of the prior art clamp 400, caused by lapping, can increase part-to-part variability in the effective clamping radius (depending on the amount of material removed during lapping, which may vary from part to part). Part-to-part variability in effective clamping radius is undesirable in a disk drive because it may cause undesirable part-to-part variation in disk dynamic behavior and/or read head to disk spacing.

Figure 5:
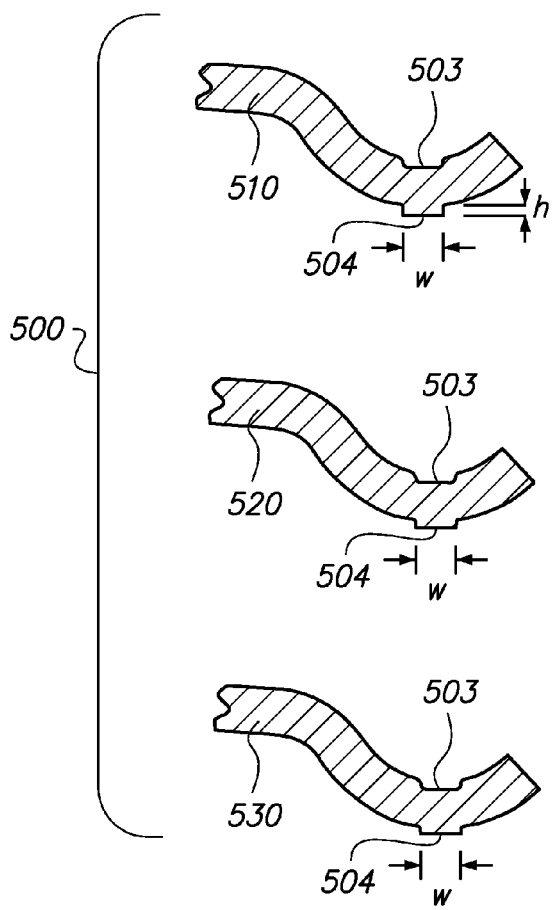
FIG. 5 is a radial cross-sectional view of a portion of a spindle motor hub after progressive stages of lapping, according to an embodiment of the present invention.

FIG. 5 is a radial cross-sectional view of a portion of a disk clamp 500 after progressive stages of lapping, according to an embodiment of the present invention. The disk clamp 500 includes an annular rib 504, created by a stamping process that leaves a negative image 503 imprinted on the opposite face of the disk clamp 500, as a structural artifact of the stamping process. The annular rib 504 has a radial extent w.

The cross-section 510 represents the disk clamp 500 before lapping. Before lapping, the annular rib 504 preferably but not necessarily defines a rib height h that is in the range 50 microns to 250 microns. In certain embodiments, such dimensional range have criticality because its minimum may ensure that h is adequate for the annular rib 504 to not be completely removed by lapping, and the maximum may prevent interference of disk drive parts by ensuring adequate clearance in the so-called Z direction (i.e. parallel to the spindle rotation axis). Note that in the embodiment of FIG. 5, prior to lapping, the depth of the negative image 503 may be equal to h, so that the thickness of the disk clamp 500 measured at the location of the annular rib 504 may be equal to the thickness measured elsewhere on the disk clamp 500.

The cross-section 520 represents the disk clamp 500 at an intermediate stage of lapping. Note that at this stage, the lapping has reduced the height of the annular rib 504 to be less than h, but the radial extent of the disk contact surface of the annular rib 504 remains substantially unchanged (i.e. remains substantially constant at w). The cross-section 530 represents the disk clamp 500 after the completion of lapping. Note that at this stage, the lapping has further reduced the height of the annular rib 504, while the radial extent of the disk contact surface of the annular rib 504 remains substantially constant at w). Note that in the embodiment of FIG. 5, the lapping is not continued to the point where the annular rib 504 would be completely eliminated.

Hence, the embodiment of FIG. 5 may provide consistency and independence of the radial extent w of the disk contact surface of the annular rib 504, despite variability in the duration or conditions of the lapping process. That may desirably reduce part-to-part variability in the effective clamping radius and clamping annular area (with reduced sensitivity to the amount of material removed during lapping), and therefore reduce undesirable part-to-part variation in disk dynamic behavior and/or read head to disk spacing.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
   a disk drive base;
   a spindle motor attached to the disk drive base, the spindle motor including a hub that rotates about a spindle rotation axis;
   an annular disk mounted on the hub;
   a read head disposed adjacent to the annular disk; and
   a clamp attached to the hub, the clamp including
      a stamped sheet metal body portion, and
      an annular rib that protrudes from the stamped sheet metal body portion towards the annular disk,
      wherein the annular rib includes
         an annular contact surface that contacts the annular disk, and
         inner and outer side walls that are each normal to the annular contact surface.

2. The disk drive of claim 1 wherein the annular rib is a coined annular rib.

3. The disk drive of claim 1 wherein the clamp is attached to the hub by a plurality of threaded fasteners that extend into a plurality corresponding threaded holes in the hub.

4. The disk drive of claim 1 wherein the annular contact surface has a contact surface normal that is parallel to the spindle rotation axis.

5. The disk drive of claim 4 wherein the inner side wall is shaped as a first right circular cylinder about the spindle rotation axis.

6. The disk drive of claim 5 wherein the outer side wall is shaped as a second right circular cylinder about the spindle rotation axis, and the first right circular cylinder is concentric with and disposed within the second right circular cylinder.

7. The disk drive of claim 1 wherein the inner side wall defines a rib height measured parallel to the spindle rotation axis, in the range 50 microns to 250 microns.

8. The disk drive of claim 1 wherein a first thickness of the clamp, that is measured at the stamped sheet metal body portion and not at the annular rib, is in the range 0.4 mm to 0.8 mm.

9. The disk drive of claim 1 wherein the stamped sheet metal body portion and the annular rib are together a single component having material continuity rather than being an assembly of sub-components.

10. The disk drive of claim 1 wherein the annular contact surface is within a flatness tolerance that does not exceed 10 microns.

* * * * *